United States Patent
Wang et al.

(10) Patent No.: US 11,699,290 B1
(45) Date of Patent: Jul. 11, 2023

(54) PEDESTRIAN RE-IDENTIFICATION METHOD AND APPARATUS BASED ON LOCAL FEATURE ATTENTION

(71) Applicant: ZHEJIANG LAB, Hangzhou (CN)

(72) Inventors: Hongsheng Wang, Hangzhou (CN); Guang Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/954,129

(22) Filed: Sep. 27, 2022

Related U.S. Application Data (63) Continuation of application No. PCT/CN2022/116176, filed on Aug. 31, 2022.

(30) Foreign Application Priority Data

Jun. 23, 2022 (CN) .......................... 202210714468.1

(51) Int. Cl.
*G06V 20/52* (2022.01)
*G06V 10/774* (2022.01)
*G06V 10/82* (2022.01)
(Continued)

(52) U.S. Cl.
CPC .............. *G06V 20/53* (2022.01); *G06T 5/009* (2013.01); *G06T 7/73* (2017.01); *G06T 7/90* (2017.01);
(Continued)

(58) Field of Classification Search
None
See application file for complete search history.

(56) References Cited

U.S. PATENT DOCUMENTS 11,270,124 B1    3/2022  Carvalho et al.
2012/0274781 A1* 11/2012  Shet .................... G06T 7/277
                                         348/169
(Continued)

FOREIGN PATENT DOCUMENTS

CN    111652066 A    9/2020
CN    112818790 A    5/2021
(Continued)

OTHER PUBLICATIONS

A novel model based on deep learning for Pedestrian detection and Trajectory prediction. Shi et al. (Year: 2019).*
(Continued)

*Primary Examiner* — Delomia L Gilliard
(74) *Attorney, Agent, or Firm* — IPro, PLLC (57) ABSTRACT

Disclosed are a pedestrian re-identification method and apparatus based on local feature attention. The method includes the following steps: S1: obtaining an original surveillance video image data set, and dividing the original surveillance video image data set into a training set and a test set in proportion; and S2: performing image enhancement on the original surveillance video image training set to obtain enhanced images, and converting the enhanced images into sequence data. The pedestrian re-identification technology based on local feature attention uses a multi-head attention mechanism neural network to capture, extract video image feature sequences and replace convolution kernels in a convolutional neural network, uses fully connected layers and an activation function to combine local pedestrian feature sequences into complete pedestrian feature sequences through a weight matrix, performs prediction on the obtained pedestrian feature sequences, outputs position coordinates of pedestrians in the images and selects pedestrians to realize pedestrian re-identification.

10 Claims, 4 Drawing Sheets

(51) Int. Cl.
*G06V 40/10* (2022.01)
*G06T 7/73* (2017.01)
*G06T 5/00* (2006.01)
*G06T 7/90* (2017.01)
*G06V 20/40* (2022.01)

(52) U.S. Cl.
CPC ............ *G06V 10/774* (2022.01); *G06V 10/82* (2022.01); *G06V 20/41* (2022.01); *G06V 20/46* (2022.01); *G06V 40/10* (2022.01); *G06T 2207/10016* (2013.01); *G06T 2207/10024* (2013.01); *G06T 2207/20081* (2013.01); *G06T 2207/20084* (2013.01); *G06T 2207/30196* (2013.01); *G06T 2207/30232* (2013.01)

(56) References Cited

U.S. PATENT DOCUMENTS

| | | | | |
|---|---|---|---|---|
| 2018/0374233 | A1* | 12/2018 | Zhou | G06F 18/22 |
| 2020/0005090 | A1* | 1/2020 | Shen | G06F 18/2321 |
| 2020/0226421 | A1 | 7/2020 | Almazan et al. | |
| 2022/0121953 | A1* | 4/2022 | Suh | G06N 3/04 |
| 2022/0164571 | A1* | 5/2022 | Tang | G06V 40/103 |
| 2022/0180534 | A1* | 6/2022 | Sun | G06V 40/172 |
| 2022/0415023 | A1* | 12/2022 | Han | G06V 10/82 |
| 2023/0095533 | A1* | 3/2023 | Wong | G06T 7/292 |
| | | | | 382/181 |

FOREIGN PATENT DOCUMENTS

| | | |
|---|---|---|
| CN | 113221625 A | 8/2021 |
| CN | 113627266 A | 11/2021 |
| CN | 113936339 A | 1/2022 |
| CN | 113989838 A | 1/2022 |
| CN | 114220124 A | 3/2022 |
| CN | 114359970 A | 4/2022 |
| CN | 114783003 A | 7/2022 |

OTHER PUBLICATIONS

A Study on Pedestrian Re-identification Based on Transfer Learning. Cheng et al. (Year: 2021).*
Diversity Regularized Spatiotemporal Attention for Video-based Person Re-identification. Li et al. (Year: 2018).*
Pedestrian Re-Identification Monitoring System Based on Deep Convolutional Neural Network. Qu et al. (Year: 2020).*
Luo Huicheng, Wang Shujuan. "Feature Alignment and Discriminative Enhancement for Vehicle Re-Identification under the Transformer Framework." Video Engineering, 45(12):129-135. 2021. DOI 10. 16280/j. videoe. 2021. 12. 037.
Hongchen Tan, et al. MHSA-Net: Multi-Head Self-Attention Network for Occluded Person Re-Identification. arXiv:2008.04015v4 [cs.CV] Apr. 16, 2022.

* cited by examiner

PEDESTRIAN RE-IDENTIFICATION METHOD AND APPARATUS BASED ON LOCAL FEATURE ATTENTION

Cross-Reference to Related Applications

The present application claims priority to Chinese Patent Application No. CN202210714468.1 filed to China National Intellectual Property Administration on Jun. 23, 2022 and entitled "PEDESTRIAN RE-IDENTIFICATION METHOD AND APPARATUS BASED ON LOCAL FEATURE ATTENTION", which is incorporated herein by reference in its entirety.

Technical Field

The present disclosure relates to the field of computer vision technology, and in particular, to a pedestrian re-identification method and apparatus based on local feature attention.

Background

Pedestrian re-identification is a technology that uses computer vision technology to detect and identify whether there is a specific pedestrian in a surveillance video or image, it provides a surveillance pedestrian image, and searches and identifies the pedestrian image under cross-monitoring equipment. There are differences in the posture, appearance, shooting distance, etc. of pedestrians under different cameras. In most cases, usable face images cannot be acquired. In this case, pedestrian re-identification technology is used to realize pedestrian identification. The multi-head attention mechanism feature sequence pedestrian re-identification technology uses a multi-head attention mechanism neural network to capture and extract a video image feature sequence, uses fully connected layers and an activation function to combine local pedestrian feature sequences into a complete pedestrian feature sequence through a weight matrix, performs prediction on the obtained pedestrian feature sequence, and selects pedestrians in an image to realize pedestrian re-identification.

Summary

The objective of the present disclosure is to provide a pedestrian re-identification method and apparatus based on local feature attention to overcome the deficiencies in the prior art.

To achieve the above objective, the present disclosure provides the following technical solutions:

The present disclosure discloses a pedestrian re-identification method based on local feature attention, including the following steps:
- S1: obtaining an original surveillance video image data set, and dividing the original surveillance video image data set into a training set and a test set in proportion;
- S2: performing image enhancement on the original surveillance video image training set to obtain enhanced images, and converting the enhanced images into sequence data;
- S3: performing feature sequence extraction on the enhanced images by using a pedestrian re-identification neural network to obtain feature sequences of all objects in the images;
- S4: capturing, from the feature sequences of all objects in the images, local pedestrian feature sequences by using a multi-head attention mechanism;
- S5: combining the local pedestrian feature sequences into complete pedestrian feature sequences through a weight matrix by using fully connected layers and an activation function;
- S6: performing prediction on the obtained pedestrian feature sequences to determine position coordinates of pedestrians in the images;
- S7: calculating a predicted intersection ratio of the pedestrian feature sequences according to the obtained position coordinates of pedestrians and the coordinates of image annotation samples in the original surveillance video image data set;
- S8: iteratively training a pedestrian re-identification neural network by means of residual connection to obtain a pedestrian re-identification detection model; and
- S9: inputting the test set into the pedestrian re-identification detection model to output pedestrian identification results.

Preferably, the original surveillance video image data set in step S1 includes image annotation samples, an image annotation sample coordinate file, and unannotated samples.

Preferably, the specific sub-steps of step S2 are as follows:
- S21: converting color images into gray images;
- S22: transforming video surveillance images from relatively concentrated gray intervals to uniform distribution in an entire gray range by means of histogram equalization, nonlinearly stretching the images and redistributing image pixel values, so that the gray range is roughly the same;
- S23: detecting dark colors in a signal part and a light color part of each image by means of gamma correction, and increasing the ratio of the two to improve the image contrast effect; and
- S24: segmenting each enhanced image according to the number of height and width channels of the image to obtain a grid image sequence, converting the size of each grid image into an input size that can be received by the pedestrian re-identification neural network, and converting each grid image sequence into a two-dimensional matrix as the input to the pedestrian re-identification neural network.

Preferably, in step S24, the length of the grid image sequence is equal to the size of grid images multiplied by the height and width of grid images, the grid images with different sizes are mapped by using a linear network into grid images with token features that can be received by the pedestrian re-identification neural network and have a constant input size, the grid images with token features are tiled to form a sequence including position codes of the grid images, and then each grid image sequence is converted into the two-dimensional matrix.

Preferably, the specific process of step S3 is: forming the feature sequences by calculating and counting gradient direction histograms of image local regions, and describing the appearance and shape of local targets by means of direction density distribution of gradients.

Preferably, the specific process of step S4 is: for each pixel of the grid image, calculating a local self-attention adjacent to each pixel, and converting the two-dimensional matrix into a parallel matrix for calculation to capture the local pedestrian feature sequences by using a local multi-head self-attention mechanism.

Preferably, the specific process of step S5 is: inputting, by using the two fully connected layers and the activation function, the captured pedestrian feature sequences to the first fully connected layer and activating the same to obtain some neurons that conform to the existence of the local pedestrian feature sequences, combining the extracted local pedestrian feature sequences and inputting the same to neurons of the second fully connected layer to obtain the complete pedestrian feature sequences.

Preferably, the specific process of step S6 is: inputting the pedestrian feature sequences to the pedestrian re-identification neural network, performing calculation by means of multi-head attentions, detecting how many pedestrian feature sequence elements are on center points of the grid images, calculating distances from the centers to the boundaries of the grid images so as to obtain the position coordinates of pedestrians, and drawing bounding boxes of the pedestrians in the video surveillance images according to the obtained position coordinates.

The present disclosure discloses a pedestrian re-identification apparatus based on local feature attention, including the following modules:
- an original surveillance video image sample set obtaining module: configured to obtain an original data set, including annotated samples, unannotated samples, and an annotated sample coordinate file;
- an image pre-processing module: configured to perform image pre-processing on the original surveillance video image data set;
- an image enhancement module: configured to enhance images in a training set to obtain corresponding enhanced images;
- an image feature sequence extraction module: configured to extract enhanced image feature sequences;
- a pedestrian feature sequence capture module: configured to capture local pedestrian feature sequences by using a multi-head attention mechanism according to feature sequences of all objects in the images;
- a fully connected layer module: configured to combine the local pedestrian feature sequences into complete pedestrian feature sequences through a weight matrix;
- a pedestrian position prediction module: configured to predict position coordinates in the images according to the complete pedestrian feature sequences;
- an intersection ratio calculation module: configured to calculate, according to the position coordinates of pedestrians in the images and the coordinates of the image annotation samples in the original surveillance video image data set, an intersection ratio of the two coordinates;
- a model training module: configured to train a pedestrian re-identification neural network by means of residual connection to obtain a pedestrian re-identification model; and
- an image pedestrian identification module: configured to input a test set to identify pedestrians by using the pedestrian re-identification model.

The present disclosure further discloses a pedestrian re-identification apparatus based on local feature attention, the apparatus includes a memory and one or more processors, the memory stores executable codes, and the one or more processors execute the executable codes to implement the above-mentioned pedestrian re-identification method based on local feature attention.

Beneficial effects of the present disclosure are as follows: according to the pedestrian re-identification method and apparatus based on local feature attention of the present disclosure, the pedestrian re-identification technology based on local feature attention uses a multi-head attention mechanism neural network to capture and extract video image feature sequences, uses a multi-head attention mechanism to replace convolution kernels in a convolutional neural network, uses fully connected layers and an activation function to combine local pedestrian feature sequences into complete pedestrian feature sequences through a weight matrix, performs prediction on the obtained pedestrian feature sequences, outputs position coordinates of pedestrians in the images and selects pedestrians to realize pedestrian re-identification.

DETAILED DESCRIPTION

In order to make the objectives, technical solutions and advantages of the present invention clearer, the following further describes the present invention in detail through the accompanying drawings and embodiments. However, it should be understood that the specific embodiments described herein are only used to explain the present invention, but not to limit the scope of the present invention. In addition, descriptions on well-known structures and technologies are omitted below in order to avoid unnecessarily obscuring the concept of the present invention.

Figure 1:
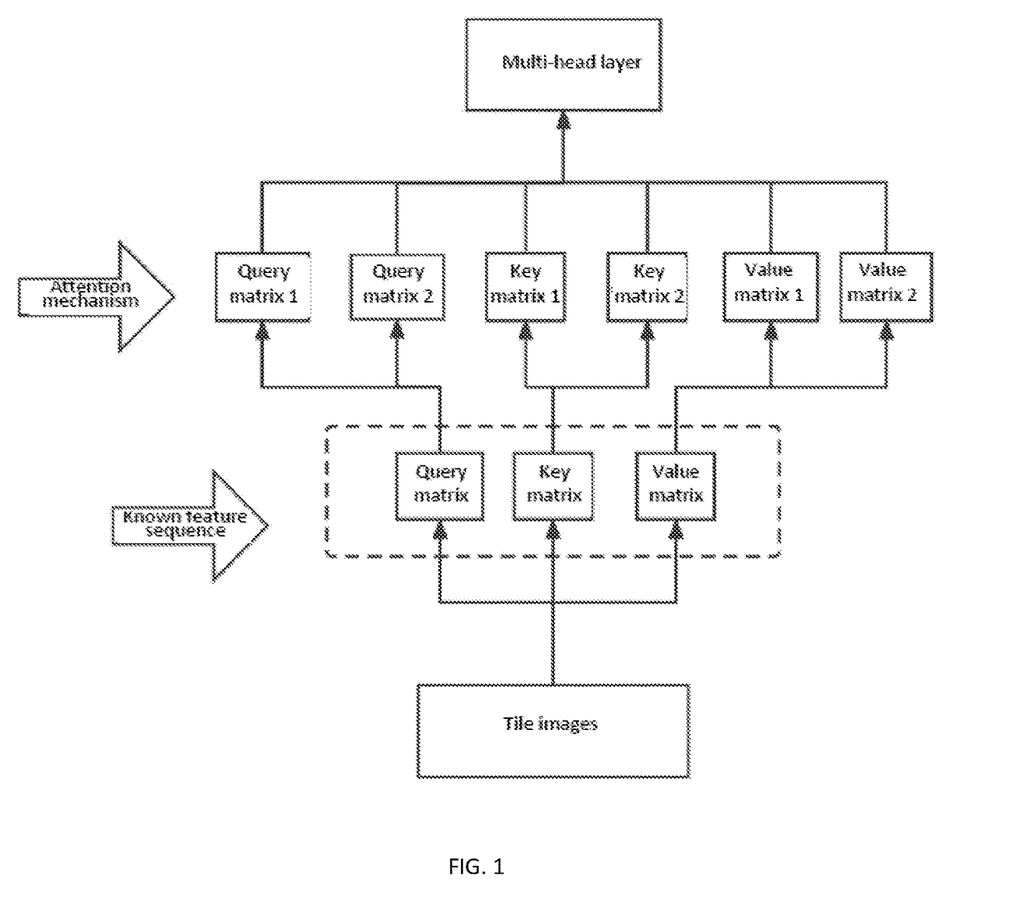
FIG. 1 is an overall flowchart according to an embodiment of the present disclosure.

With reference to FIG. 1, the present disclosure provides a pedestrian re-identification method based on local feature attention, including the following steps:
- S1: obtaining an original surveillance video image data set, and dividing the original surveillance video image data set into a training set and a test set in proportion;
- S2: performing image enhancement on the original surveillance video image training set to obtain enhanced images, and converting the enhanced images into sequence data;
- S3: performing feature sequence extraction on the enhanced image by using a pedestrian re-identification neural network to obtain feature sequences of all objects in the images;
- S4: capturing, from the feature sequences of all objects in the images, local pedestrian feature sequences by using a multi-head attention mechanism;
- S5: combining the local pedestrian feature sequences into complete pedestrian feature sequences through a weight matrix by using fully connected layers and an activation function;
- S6: performing prediction on the obtained pedestrian feature sequences to determine position coordinates of pedestrians in the images;
- S7: calculating a predicted intersection ratio of the pedestrian feature sequences according to the obtained position coordinates of pedestrians and the coordinates of image annotation samples in the original surveillance video image data set;
- S8: iteratively training a pedestrian re-identification neural network by means of residual connection to obtain a pedestrian re-identification detection model; and S9: inputting the test set into the pedestrian re-identification detection model to output pedestrian identification results.

In addition, the present disclosure further provides a pedestrian re-identification apparatus based on local feature attention, including the following modules: an original surveillance video image sample set obtaining module: configured to obtain an original data set, including annotated samples, unannotated samples, and an annotated sample coordinate file;
 an image pre-processing module: configured to perform image pre-processing on the original surveillance video image data set;
 an image enhancement module: configured to enhance images in a training set to obtain corresponding enhanced images;
 an image feature sequence extraction module: configured to extract enhanced image feature sequences;
 a pedestrian feature sequence capture module: configured to capture local pedestrian feature sequences by using a multi-head attention mechanism according to feature sequences of all objects in the images;
 a fully connected layer module: configured to combine the local pedestrian feature sequences into complete pedestrian feature sequences through a weight matrix;
 a pedestrian position prediction module: configured to predict position coordinates in the images according to the complete pedestrian feature sequences;
 an intersection ratio calculation module: configured to calculate, according to the position coordinates of pedestrians in the images and the coordinates of the image annotation samples in the original surveillance video image data set, an intersection ratio of the two coordinates;
 a model training module: configured to train a pedestrian re-identification neural network by means of residual connection to obtain a pedestrian re-identification model; and
 an image pedestrian identification module: configured to input a test set to identify pedestrians by using the pedestrian re-identification model.

The present disclosure is described in detail by the following steps. The present disclosure discloses a pedestrian re-identification method and apparatus based on local feature attention. The whole process is divided into four stages.

Figure 2:
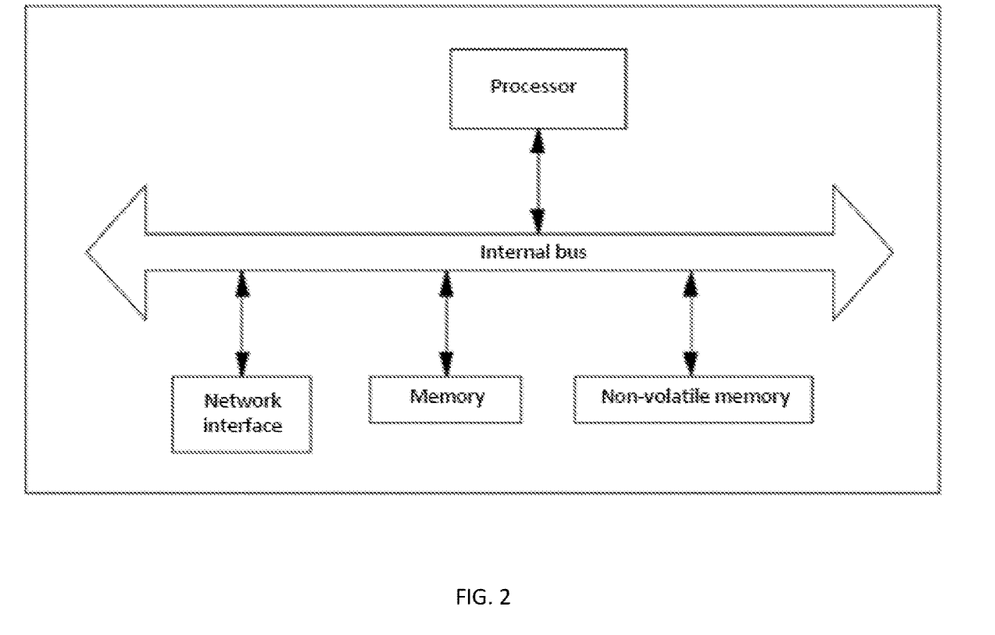
FIG. 2 is a schematic diagram of image segmentation according to an embodiment of the present disclosure.

Stage 1, enhancement and pre-processing of surveillance video images: as shown in FIG. 2, image enhancement is performed on an original surveillance video image training set to obtain enhanced images, and the enhanced images are segmented to obtain grid images.

The first stage is specifically: obtaining a video image data set including image annotation samples, an image annotation sample coordinate file, and unannotated samples; enhancing video images to obtain enhanced images; converting the enhanced images into sequence data, which includes the following sub-steps:
 Step 1: transforming the video surveillance images from relatively concentrated gray intervals to uniform distribution in an entire gray range by means of histogram equalization, nonlinearly stretching the images and redistributing image pixel values, so that the gray range is roughly the same.
 Step 2: detecting dark colors in a signal part and a light color part of each video surveillance image by means of gamma correction, and increasing the ratio of the two to improve the image contrast effect.
 Step 3: segmenting each video surveillance image according to the number of height and width channels of the image to obtain a grid image sequence, the length of which is equal to the size of grid images multiplied by the height and width of grid images; mapping the grid images with different sizes by using a linear network into grid images with token features that can be received by the pedestrian re-identification neural network and have a constant input size, tiling the grid images with token features to form a sequence including position codes of the grid images, and then converting the sequence into a two-dimensional matrix as the input of the pedestrian re-identification neural network (Transformer).

Figure 3:
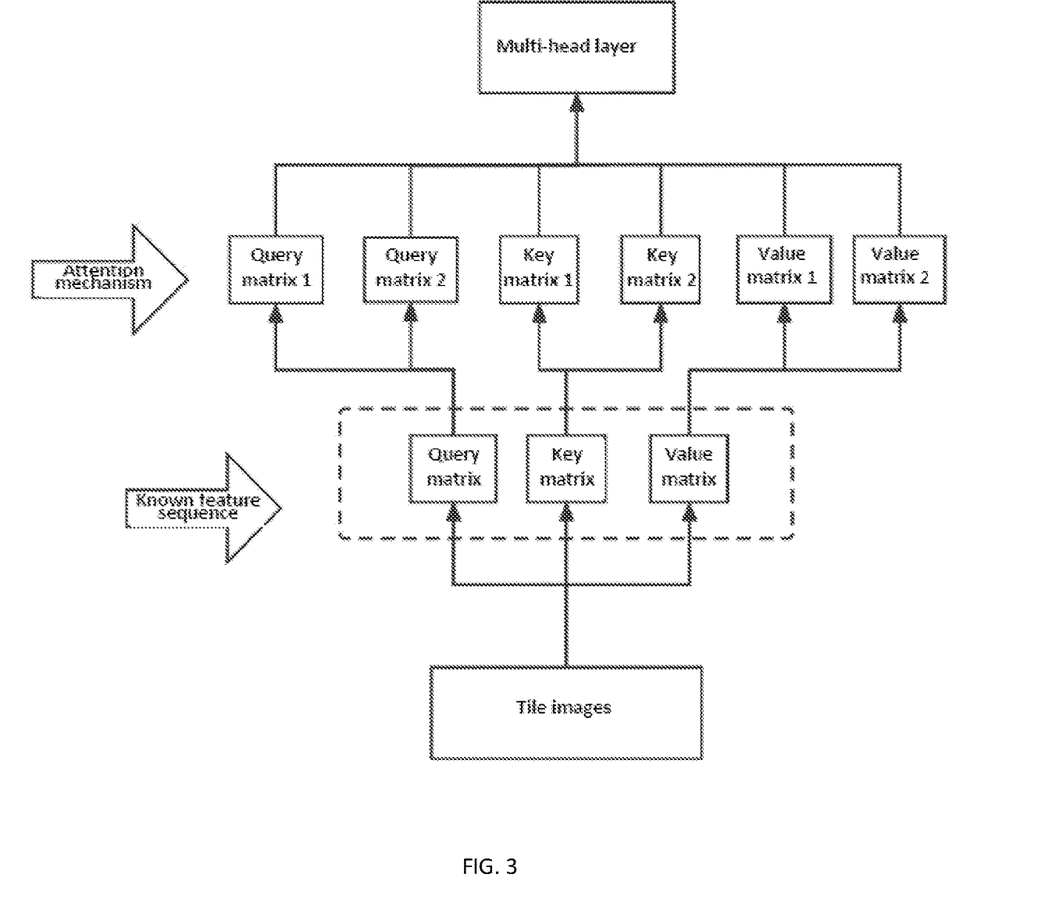
FIG. 3 is a schematic diagram of a multi-head attention mechanism according to an embodiment of the present disclosure.

Stage 2, capture of surveillance video image object feature sequences and pedestrian feature sequences: as shown in FIG. 3, the pedestrian re-identification neural network (Transformer) performs feature sequence extraction on the enhanced images, and uses a multi-head attention mechanism to capture local pedestrian feature sequences.

The second stage is specifically: inputting the two-dimensional matrices into the pedestrian re-identification neural network (Transformer) to perform feature sequence extraction, which includes the following sub-steps:
 Step 1: calculating and counting gradient direction histograms of image local regions to form feature sequences, where the appearance and shape of local targets can be described by means of direction density distribution of gradients.
 Step 2: performing overall feature extraction on the two-dimensional matrices to obtain feature sequences of all objects in the grid images, where the features of the feature sequences satisfy the distribution of mean value 0 and variance 1, and the feature sequences include the relationships between all parts of all objects in the grid images;
 Step 3: for the extracted feature sequences of all objects in the grid images, converting each two-dimensional matrix into a parallel matrix by using the multi-head attention mechanism for calculation to capture local pedestrian feature sequences; inputting the whole feature sequences into an embedding layer to obtain vector feature sequences with the same length, where the calculation method is as follows:
  1. Input a query matrix Query, a key matrix Key, and a value matrix Value of the vector feature sequence into a multi-head layer;
  2. Use $X=[x_1,x_2,x_3 \ldots x_n]$ to represent the input weight vector feature sequence;
  3. Calculate an attention distribution a: calculate a correlation by calculating a dot product of Query and Key, and calculate a score through an activation function Softmax;
  4. Quey=Key=Value=X, calculate an attention weight through the activation function Softmax:
   $\alpha_i$=Softmax($s(k_i,q)$)=Softmax($s(x_i,q)$);
   Herein, $\alpha_i$ is an attention probability distribution, and ($s(x_i,q)$) is an attention scoring mechanism.
 Step 4: mapping, by using two fully connected layers, the captured pedestrian feature sequences to the first fully connected layer and activating the same through the activation function to obtain some neurons that conform to the existence of the local pedestrian feature sequences, combining the extracted local pedestrian feature sequences and inputting the same to neurons of the second fully connected layer to obtain complete pedestrian feature sequences. The formula of the activation function is as follows:

GULE(x)=xP(X<=x)=xΦ(x)

Herein, GULE(x) is the activation function, x is the pedestrian feature sequence, P is a probability distribution, X is the overall feature sequence, and Φ(x) is a probability function of normal distribution.

Stage 3, prediction of position coordinates of the pedestrian feature sequences in the surveillance video images: predicting the position coordinates of the pedestrian feature sequences, and selecting pedestrians in the images.

The third stage is specifically: predicting the position coordinates of pedestrians, and predicting pedestrian bounding boxes, which includes the following sub-steps:

Step 1: inputting the pedestrian feature sequences into the pedestrian re-identification neural network (Transformer), performing calculation by means of multi-head attentions, detecting how many pedestrian feature sequence elements are on center points of the grid images, calculating distances from the centers to the boundaries of the grid images so as to obtain the position coordinates of pedestrians, and drawing bounding boxes of the pedestrians in the video surveillance images according to the obtained position coordinates, the position coordinates of pedestrians including upper left coordinates, upper right coordinates, lower left coordinates, and lower right coordinates.

Step 2: calculating, according to the position coordinates of pedestrians obtained in step 1 and the coordinates of the image annotation samples in the original surveillance video image data set, an intersection ratio of the two coordinates, where the calculation formula is as follows:

$$IoU = \frac{A \cap B}{A \cup B}$$

Herein, IoU is the intersection ratio, A ∩ B is an intersection of rectangular box areas of the position coordinates of pedestrians and the coordinates of the image annotation samples in the original surveillance video image data set, and A ∪ B is a union of the rectangular box areas of the position coordinates of pedestrians and the coordinates of the image annotation samples in the original surveillance video image data set.

Stage 4, training of the pedestrian re-identification neural network (Transformer) model and pedestrian identification: iteratively training the pedestrian re-identification neural network (Transformer) by means of residual connection to obtain a pedestrian re-identification detection model, and identifying pedestrians.

The fourth stage specifically includes training of the pedestrian re-identification neural network (Transformer) model and pedestrian identification, which includes the following sub-steps:

Step 1: due to the large size of the pedestrian re-identification neural network (Transformer) model, to prevent the model from gradient explosion and gradient disappearance during the training process, using the residual connection to accelerate the convergence of the model, performing iterative training, and adjusting training parameters to obtain the pedestrian re-identification detection model.

Step 2: according to the pedestrian re-identification detection model obtained by training in step 1, inputting the original surveillance video image test set for prediction and selecting pedestrians in the images to realize pedestrian re-identification.

Figure 4:
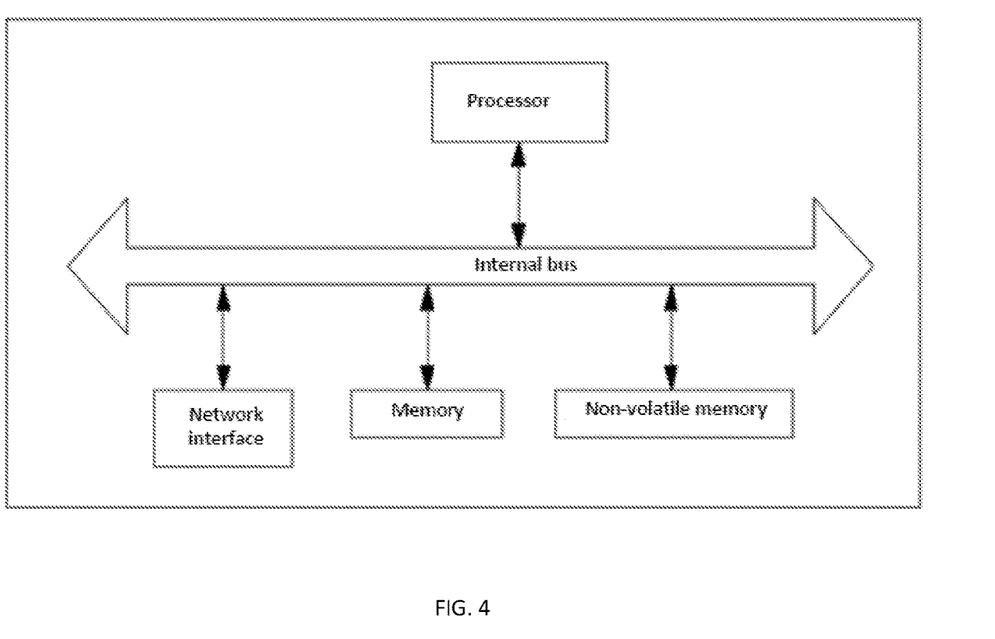
FIG. 4 is a schematic diagram of an apparatus according to an embodiment of the present disclosure.

With reference to FIG. 4, an embodiment of the present disclosure further provides a pedestrian re-identification apparatus based on local feature attention, including a memory and one or more processors, where the memory stores executable codes, and the one or more processors execute the executable codes to implement the pedestrian re-identification method based on local feature attention in the above-mentioned embodiment.

The embodiment of the pedestrian re-identification apparatus based on local feature attention in the present disclosure can be applied to any device with data processing capability, which can be a device or apparatus such as a computer. The embodiment of the apparatus can be implemented by software, hardware, or a combination of hardware and software. Taking the software implementation as an example, the logical apparatus is formed by reading corresponding computer program instructions in a non-volatile memory into a memory through a processor of any device with data processing capability where the apparatus is located. In terms of hardware, FIG. 4 shows a hardware structure diagram of any device with data processing capability where the pedestrian re-identification apparatus based on local feature attention is located. Except the processor, memory, network interface and non-volatile memory shown in FIG. 4, the any device with data processing capability where the apparatus is located in the embodiment may further include other hardware according to its actual function. Details are not described herein. Details of the implementation process of the functions and effects of the units in the above-mentioned apparatus are shown the implementation process of the corresponding steps in the above-mentioned method, and the details are not described herein.

The embodiment of the apparatus substantially corresponds to the embodiment of the method, so relevant parts may refer to the parts of the embodiment of the method. The apparatus examples described above are merely illustrative. The units described as separate components may or may not be physically separated, and the components displayed as units may or may not be physical units, that is, they may be located in one place, or may be distributed to a plurality of network units. Some or all of the modules may be selected according to actual needs to achieve the objectives of the solutions of the present disclosure. Those of ordinary skill in the art can understand and implement without any creative effort.

An embodiment of the present disclosure further provides a computer-readable storage medium on which a program is stored, and when the program is executed by a processor, the pedestrian re-identification method based on local feature attention in the above-mentioned embodiment is implemented.

The computer-readable storage medium may be an internal storage unit of any device with data processing capability described in any of the foregoing embodiments, such as a hard disk or a memory. The computer-readable storage medium may also be an external storage device of any device with data processing capability, such as a plug-in hard disk, a Smart Media Card (SMC), an SD card, or a flash card equipped on the device. Further, the computer-readable storage medium may further include both an internal storage unit of any device with data processing capability and an external storage device. The computer-readable storage medium is used to store the computer program and other programs and data required by the device with data processing capability, and may also be used to temporarily store data that has been output or will be output.

According to the pedestrian re-identification method and apparatus based on local feature attention of the present disclosure, the following experiment was carried out:

Step 1: Obtain a Market-1501 data set. The data set was collected in the campus of Tsinghua University. 6 cameras (including 5 high-definition cameras and 1 low-definition camera) captured 1501 pedestrians, 32668 rectangular pedestrian boxes were detected out, the training set had 751 pedestrians and included 12936 images, and each pedestrian had an average of 17.2 pieces of training data; the test set had 750 pedestrians and included 19732 images, and each pedestrian had an average of 26.3 pieces of test data.

Step 2: Detect the 19732 images with the data set in step 1 by using the pedestrian re-identification method based on attention mechanism provided by the present disclosure according to the specific implementation steps of the present disclosure, where 700 pedestrians were identified out, and the re-identification rate of pedestrians was 87.36%. According to the experiment, there were differences in the posture, appearance, shooting distance, etc. of pedestrians under different cameras. In most cases, usable face images cannot be obtained. At this time, the pedestrian re-identification method based on attention mechanism can be used to improve the re-identification effect of pedestrians.

The above descriptions are only preferred embodiments of the present disclosure, and are not intended to limit the present invention. Any modifications, equivalent replacements or improvements, etc. made within the spirit and principle of the present invention shall be included in the protection scope of the present invention.

What is claimed is:

1. A pedestrian re-identification method based on local feature attention, comprising the following steps:
   S1: obtaining an original surveillance video image data set, and dividing the original surveillance video image data set into a training set and a test set in proportion;
   S2: performing image enhancement on the original surveillance video image training set to obtain enhanced images, and converting the enhanced images into sequence data;
   S3: performing feature sequence extraction on the enhanced image by using a pedestrian re-identification neural network to obtain feature sequences of all objects in the images;
   S4: capturing, from the feature sequences of all objects in the images, local pedestrian feature sequences by using a multi-head attention mechanism;
   S5: combining the local pedestrian feature sequences into complete pedestrian feature sequences through a weight matrix by using fully connected layers and an activation function;
   S6: performing prediction on the obtained pedestrian feature sequences to determine position coordinates of pedestrians in the images;
   S7: calculating a predicted intersection ratio of the pedestrian feature sequences according to the obtained position coordinates of pedestrians and the coordinates of image annotation samples in the original surveillance video image data set;
   S8: iteratively training a pedestrian re-identification neural network by means of residual connection to obtain a pedestrian re-identification detection model; and
   S9: inputting the test set into the pedestrian re-identification detection model to output pedestrian identification results.

2. The pedestrian re-identification method based on local feature attention according to claim 1, wherein the original surveillance video image data set in step S1 includes image annotation samples, an image annotation sample coordinate file, and unannotated samples.

3. The pedestrian re-identification method based on local feature attention according to claim 1, wherein the specific sub-steps of step S2 are as follows:
   S21: converting color images into gray images;
   S22: transforming video surveillance images from relatively concentrated gray intervals to uniform distribution in an entire gray range by means of histogram equalization, nonlinearly stretching the images and redistributing image pixel values, so that the gray range is roughly the same;
   S23: detecting dark colors in a signal part and a light color part of each image by means of gamma correction, and increasing the ratio of the two to improve the image contrast effect; and
   S24: segmenting each enhanced image according to the number of height and width channels of the image to obtain a grid image sequence, converting the size of each grid image into an input size that can be received by the pedestrian re-identification neural network, and converting each grid image sequence into a two-dimensional matrix as the input to the pedestrian re-identification neural network.

4. The pedestrian re-identification method based on local feature attention according to claim 3, wherein in step S24, the length of the grid image sequence is equal to the size of grid images multiplied by the height and width of grid images, the grid images with different sizes are mapped by using a linear network into grid images with token features that can be received by the pedestrian re-identification neural network and have a constant input size, the grid images with token features are tiled to form a sequence including position codes of the grid images, and then each grid image sequence is converted into the two-dimensional matrix.

5. The pedestrian re-identification method based on local feature attention according to claim 1, wherein the specific process of step S3 is: forming the feature sequences by calculating and counting gradient direction histograms of image local regions, and describing the appearance and shape of local targets by means of direction density distribution of gradients.

6. The pedestrian re-identification method based on local feature attention according to claim 1, wherein the specific process of step S4 is: for each pixel of the grid image, calculating a local self-attention adjacent to each pixel, and converting the two-dimensional matrix into a parallel matrix for calculation to capture the local pedestrian feature sequences by using a local multi-head self-attention mechanism.

7. The pedestrian re-identification method based on local feature attention according to claim 1, wherein the specific process of step S5 is: inputting, by using the two fully connected layers and the activation function, the captured pedestrian feature sequences to the first fully connected layer and activating the same to obtain some neurons that conform to the existence of the local pedestrian feature sequences, combining the extracted local pedestrian feature sequences and inputting the same to neurons of the second fully connected layer to obtain the complete pedestrian feature sequences.

8. The pedestrian re-identification method based on local feature attention according to claim 1, wherein the specific process of step S6 is: inputting the pedestrian feature sequences to the pedestrian re-identification neural network, performing calculation by means of multi-head attentions, detecting how many pedestrian feature sequence elements are on center points of the grid images, calculating distances from the centers to the boundaries of the grid images so as to obtain the position coordinates of pedestrians, and drawing bounding boxes of the pedestrians in the video surveillance images according to the obtained position coordinates.

9. A pedestrian re-identification apparatus based on local feature attention, wherein the apparatus comprises a memory and one or more processors, the memory stores executable codes, and the one or more processors execute the executable codes to implement the pedestrian re-identification method based on local feature attention according to claim 1.

10. A pedestrian re-identification apparatus based on local feature attention, comprising the following modules:
    an original surveillance video image sample set obtaining module: configured to obtain an original data set, including annotated samples, unannotated samples, and an annotated sample coordinate file;
    an image pre-processing module: configured to perform image pre-processing on the original surveillance video image data set;
    an image enhancement module: configured to enhance images in a training set to obtain corresponding enhanced images;
    an image feature sequence extraction module: configured to extract enhanced image feature sequences;
    a pedestrian feature sequence capture module: configured to capture local pedestrian feature sequences by using a multi-head attention mechanism according to feature sequences of all objects in the images;
    a fully connected layer module: configured to combine the local pedestrian feature sequences into complete pedestrian feature sequences through a weight matrix;
    a pedestrian position prediction module: configured to predict position coordinates in the images according to the complete pedestrian feature sequences;
    an intersection ratio calculation module: configured to calculate, according to the position coordinates of pedestrians in the images and the coordinates of the image annotation samples in the original surveillance video image data set, an intersection ratio of the two coordinates;
    a model training module: configured to train a pedestrian re-identification neural network by means of residual connection to obtain a pedestrian re-identification model; and
    an image pedestrian identification module: configured to input a test set to identify pedestrians by using the pedestrian re-identification model.

* * * * *